United States Patent [19]

Brusaw

[11] Patent Number: 5,523,781
[45] Date of Patent: Jun. 4, 1996

[54] SYSTEM FOR CONTROLLING TELEVISION AND BILLING FOR ITS USE

[75] Inventor: Scott D. Brusaw, Springboro, Ohio

[73] Assignee: Precision Industries, Incorporated, Springboro, Ohio

[21] Appl. No.: 378,063

[22] Filed: Jan. 25, 1995

Related U.S. Application Data

[63] Continuation of Ser. No. 15,156, Feb. 11, 1993, abandoned.

[51] Int. Cl.$^6$ .................................................. H04N 7/10
[52] U.S. Cl. .................................. 348/3; 348/8; 348/10; 348/12; 348/552
[58] Field of Search .................................. 348/1, 3, 5, 8, 348/12, 13, 10, 552, 730; 358/84, 86, 903, 190; 455/2, 6.3, 3.3; H04N 7/10, 5/63

[56] References Cited

U.S. PATENT DOCUMENTS

| | | | |
|---|---|---|---|
| 4,031,543 | 6/1977 | Holz | 358/86 |
| 4,439,784 | 3/1984 | Furukawa | 358/86 |
| 4,486,773 | 12/1984 | Okubo | 358/84 |
| 4,536,791 | 8/1985 | Campbell | 358/122 |
| 4,741,048 | 4/1988 | Mori | 358/84 |
| 4,792,848 | 12/1988 | Nussrallah | 358/86 |
| 4,926,256 | 5/1990 | Nanba | 358/84 |
| 4,928,168 | 5/1990 | Iwashita | 358/84 |
| 4,961,109 | 10/1990 | Tanaka | 358/84 |
| 4,985,761 | 1/1991 | Adams | 358/84 |
| 5,077,607 | 12/1991 | Johnson et al. | 358/86 |

OTHER PUBLICATIONS (Revised) Scott D. Brusaw, "PDI Computer Controlled Television System (Communicator)" (Manual), 1992.
Brochure titled "Hospital Television Systems" published 1991 by Intelligent Communications Systems, Inc., Bethlehem, PA.
Oral Communication Described Accompanying Disclosure Statement.
Larry Frank, "TV Computer Control System" (Brochure), 1992.
Larry Frank, "PDI Computer Controlled Television System (Communicator)" (manual), 1992.

*Primary Examiner*—James J. Groody
*Assistant Examiner*—Sherrie Hsia
*Attorney, Agent, or Firm*—Roger S. Dybvig

[57] ABSTRACT

A billing system for billing for the use of television sets in a hospital, hotel or the like includes a computer located in a billing office and television sets located in various rooms. Command signals from the computer, video signals, and power for powering the television are all delivered to each television set over a single coaxial cable. Each television set includes a microprocessor, a modem and logic circuits which remain active even if a user turns off his television receiver. The computer may assume control over any one or more of the television receivers by issuing a slave command which, at a time specified in the command (1) turns an addressed television receiver on if it is off and (2) tunes the addressed receiver to a specific channel. The slave commands may be of two types. One type permits no control over the TV receiver by a user and the other permits a user to override the slave command. Billing for TV usage is stored in the TV set and is transferred to the computer in response to a command from the computer. Billing information in one TV set may be transferred to another set if a user should move from one room to another. In a second embodiment, power is provided from a conventional AC wall outlet but in this case the slave commands are not executed if the television receiver is unplugged.

12 Claims, 13 Drawing Sheets

SYSTEM FOR CONTROLLING TELEVISION AND BILLING FOR ITS USE

This is a continuation of application Ser. No. 08/015,156 filed on Feb. 11, 1993, now abandoned.

FIELD OF THE INVENTION

The present invention relates to improvements in computer-based television systems suitable for use in hospitals, hotels, and the like for controlling television sets and billing for their use.

BACKGROUND OF THE INVENTION

The rental of television sets generates considerable revenue in public facilities such as hospitals and hotels and various systems have been developed to ensure that fees are collected when the television sets are used. Early systems involving signal scrambling and/or the use of credit cards, tokens or cash were not wholly satisfactory and were replaced with computer based systems wherein the charge or billing information was determined by central computer that polled the channel selection of each set and accumulated a charge for its usage. A problem with this type of system was that if the central computer should fail, all of the current billing charge information was lost.

A more recent system provides on each television set a microprocessor for monitoring the set usage and developing billing information, and a non-volatile memory for storing the information developed. A central computer may access the memory and after it retrieves the billing information the central computer may clear the memory. While this system avoids the loss of billing information, it lacks several features desirable when it is used in a hospital. For example, if a patient should be moved from one room to another, the prior art system requires the generation of two separate charges for television usage, that is, one charge for usage of the television set in each room. Also, the prior art system does not provide for complete control over the television sets from the central computer. This is desirable when the hospital desires to have the patient see an instructional video program concerning an operation he is about to undergo, or a diet or course of rehabilitation he should follow after leaving the hospital.

Furthermore, the prior art system is limited in that billing is based only on the time of viewing of premium channels; no provision is made for changing tiers, that is, channels which the patient may view, and no provision is made for changing the channels in a group of channels for which a premium will be charged.

SUMMARY OF THE INVENTION

An object of the present invention is to provide a computer controlled television system wherein individual television sets may be controlled exclusively from a central computer.

A further object of the invention is to provide a computer controlled television system wherein the on/off status of individual television sets may be controlled by a central computer.

Yet another object of the invention is to provide a computer controlled television system as described above wherein the central computer may control the time at which a television receiver may be turned on if it is off, and tune the receiver to a specified channel. The central computer may also control the time at which the television receiver is returned to its original ON/OFF status and channel.

Another object of the invention is to provide a computer controlled television system wherein power for individual television sets is derived from power supplies located remote from the television sets and supplied over coaxial cables together with commands from the computer and RF television signals.

A further object of the invention is to provide a computer controlled television system wherein charges for viewing are accumulated and stored in a memory at a user's television set and the viewing charges may be transferred to the memory in a second television set if a user is to be permitted to use the second set.

Another object of the invention is to provide a computer controlled television system as described above wherein a central computer controls the transfer of billing charges between memories in different television sets, the central computer including means for printing a single composite bill for all television sets used by a single user.

Still another object of the invention is to provide a computer controlled television system wherein messages generated at a central computer may be selectively displayed on television sets connected to the system.

A further object of the invention is to provide a computer controlled television system wherein messages for display on television sets are generated at a central computer together with a time at which the message is to be displayed.

Another object of the invention is to provide a computer controlled television system having a plurality of television sets connected to a computer, and means for selecting or changing the tier of channels which may be viewed on each set. A plurality of tiers are available and different tiers may be assigned to different sets or groups of sets.

Another object of the invention is to provide a computer controlled television system having a plurality of television sets and means for selecting the premium channels which may be viewed on each of the sets. A plurality of groups of premium channels are available and different groups may be assigned to different sets or groups of sets.

Other objects of the invention and its mode of operation will become apparent upon consideration of the following description and the accompanying drawings.

DETAILED DESCRIPTION

Figure 1:
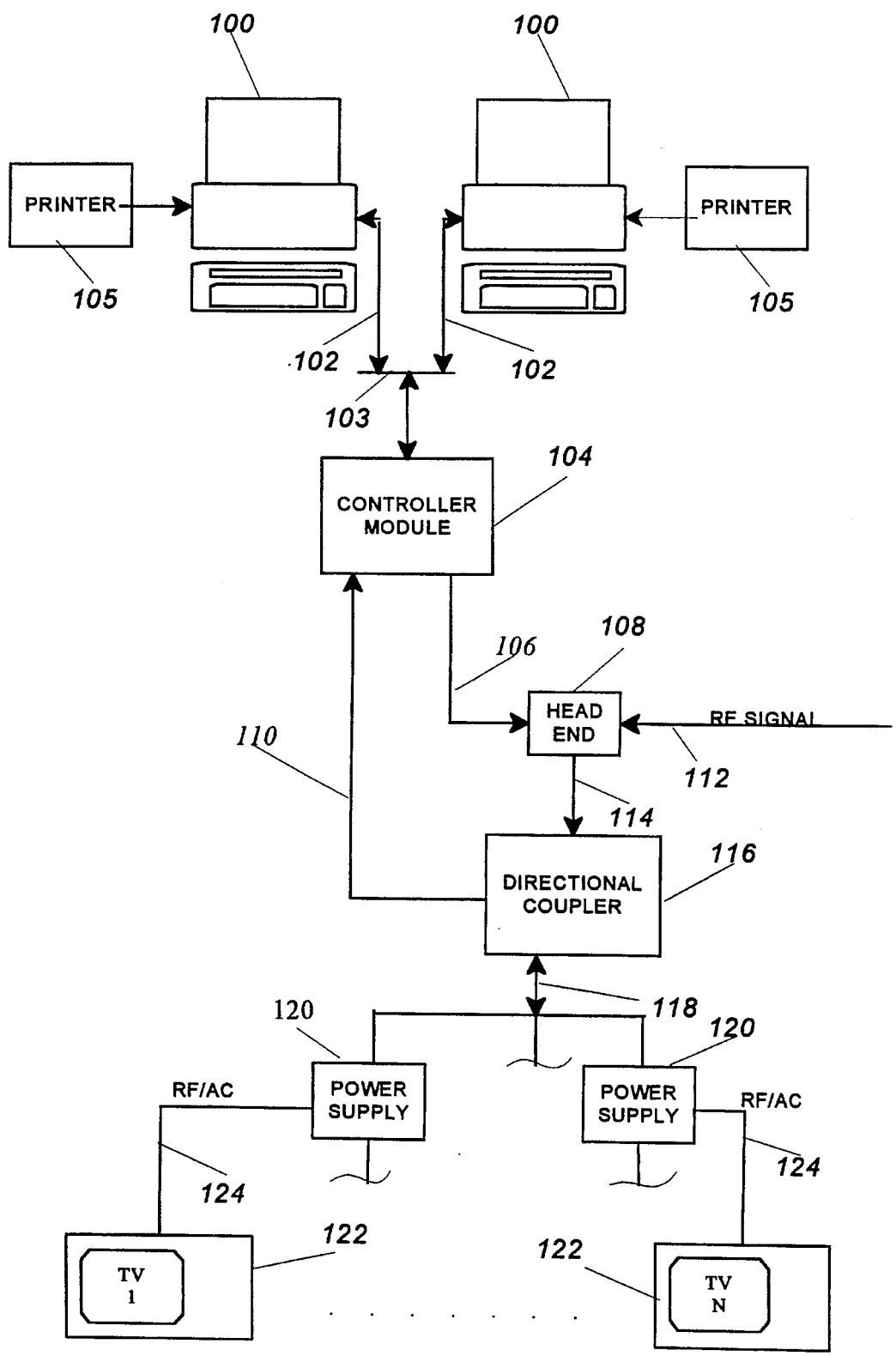
Fig. 1 is a block diagram illustrating the major components of a computer controlled television system.

As illustrated in FIG. 1, a preferred embodiment of the invention comprises one or more computers 100 which may be IBM-compatible personal computers having a modem or other means capable of transmitting or receiving RS-422 signals over leads and a printer 105 for printing billing and other data. The leads 102 are connected to a command module or controller 104 via a conventional token ring or bus arbitration network.

Command module 104 includes conventional circuits for communicating with computers 100 one at a time. The command module 104 also includes two convertors of conventional design. The first convertor includes a 75MHz frequency shift keyed transmitter which uses the RS-422 signals received from computers 100 to modulate a 75 MHz carrier signal and the modulated signal, which represents a command message to be executed by one or more television sets 122, is applied over a coaxial cable 106 to a head end circuit 108. The second convertor includes a receiver which receives a modulated 22.1 MHz signal over a coaxial cable 110, demodulates the signal, and converts the demodulated signal to an RS-422 signal that is returned to one of the computers 100.

The head end circuit 108 is of conventional design and receives from a cable 112 the RF signal, that is, the television signals which are to be selectively made available for viewing on the screens of a plurality of television sets 122. The RF signal on cable 112 may come from an antenna, a cable system, or a local video cassette recorder. The head end circuit 108 mixes the RF signal with the command message signal received over cable 106 and the mixed signal is applied over a coaxial cable 114, and through a directional coupler 116 to a coaxial cable 118. Coaxial cable 118 is connected via taps to a plurality of power supply circuits 120 and the power supply circuits are each connected to one or more of the TV sets 122. The power supply circuits 120 each produce a power signal which is used to power the TV sets 122. Each power supply 120 is capable of powering up to 20 of the TV sets. The power signal is mixed with the signal on cable 118 and the combined power, command message and video signal is distributed to the TV sets via coaxial cables 124.

The system illustrated in FIG. 1 may be installed in a hospital, hotel, motel, nursing or retirement home or similar facilities to manage billing for TV use and other services. The system is particularly adapted for use in hospitals and will henceforth be described in a hospital environment.

There may be up to 8 computers 100. One may be located in the billing department for keeping track of patient charges for TV use, room billing, medication charges, etc. Other computers may be located in the kitchen to download meal orders from patients, in the administrator's office for downloading survey information from the patients, the maintenance department for servicing and trouble shooting the system, the gift shop for filling orders placed by patients, and so forth.

A TV set 122 may be provided near each patient's bed. The sets may be supported on retractable arms mounted on a fixed structure such as a wall so that a patient has access to control buttons on the front of the set without leaving his bed. Each TV set is addressable by a command message generated by one of the computers 100 and provision is made for addressing 64K TV sets.

The TV sets 122 may be Zenith type J0920X sets with 9-inch screens, the sets being modified as subsequently described with respect to FIGS. 2 and 3 to include a microprocessor, video character generator, modem and control circuits. These sets are normally powered by 28V AC because UL standards do not permit the use of 120V lines in or along the retractable arm. Other types of TV sets may be used such as, for example, sets mounted directly on a wall and powered by 120V AC from a conventional wall outlet. In the latter case, power supplies 120 are not required. Also, the wall-mounted sets are provided with a pillow speaker and control pad connected to the TV set via a cable.

Figure 2:
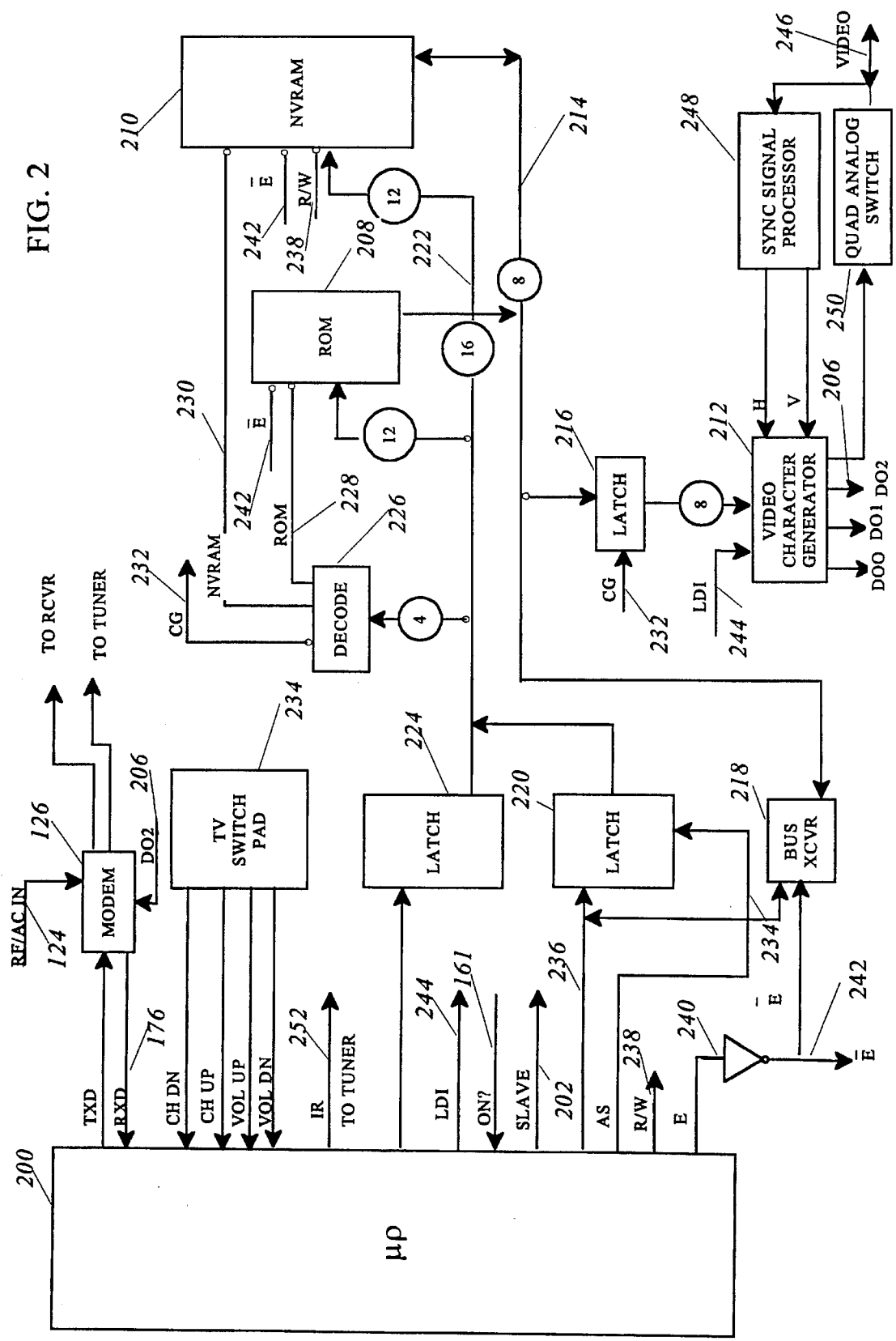
FIG. 2 is a block diagram illustrating a microprocessor, memory and video character generator included within each television set.
Figure 3:
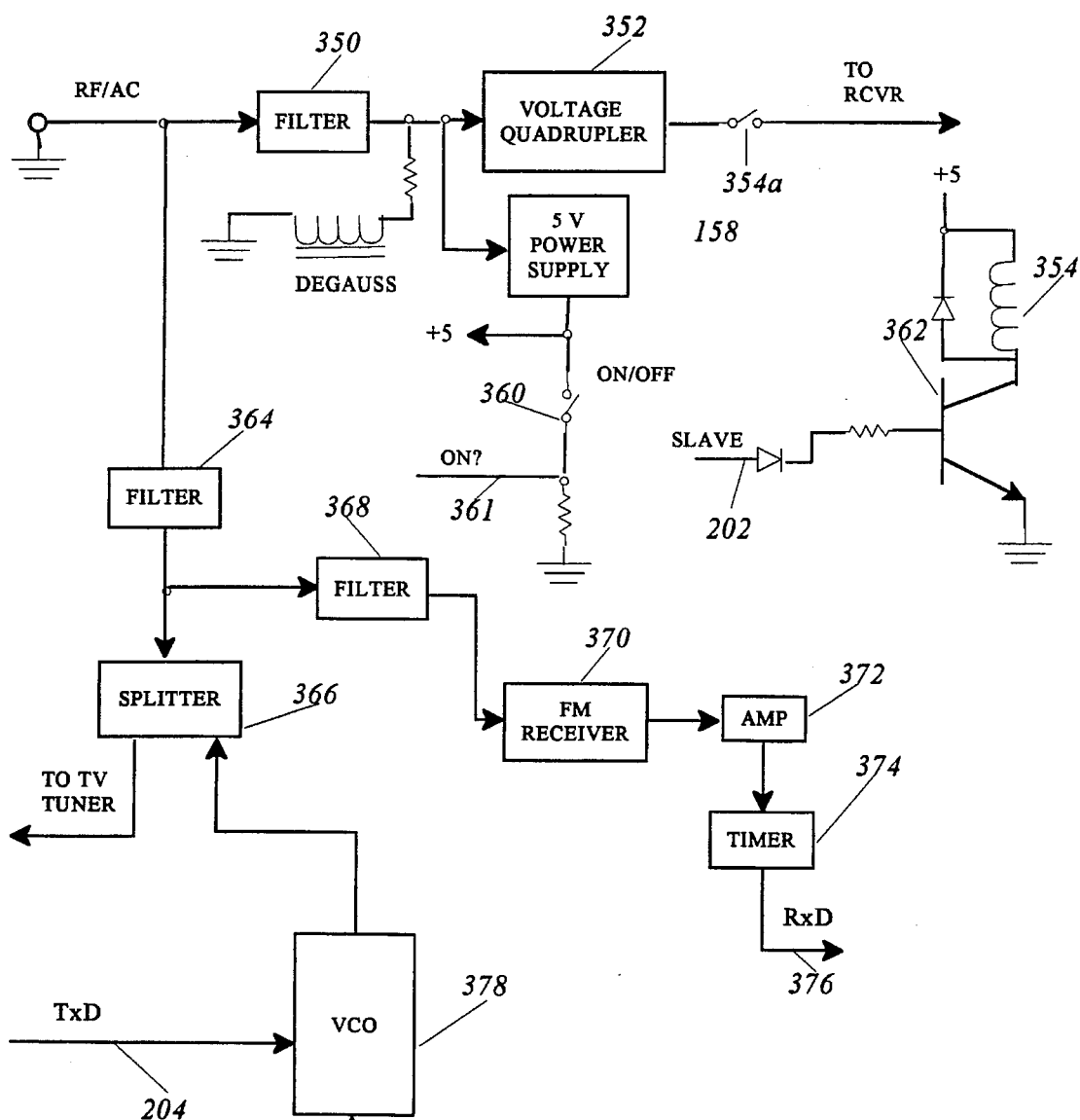
FIG. 3 shows the modem and power supply control circuit included within each television set.

The combined command message, video and power signal (if any) on coaxial cable 124 enters a TV set through a modem 126 (FIG. 2). The modem circuit is illustrated in FIG. 3. The combined signal is applied to a filter 350 which filters out all except the power signal. The output of filter 350 is applied to a voltage quadrupler 352 which provides a DC output for powering the video processing and display circuits within the television receiver. The output of voltage quadrupler 352 is controlled by a set of normally open relay contacts 354a associated with a relay 354.

The output of filter 350 is also applied to a power supply 358. The power supply 158 produces a +5V signal for powering a microprocessor 200 and various memories and logic circuits shown in FIG. 2. The +5V is available even though the television receiver is turned off. This permits the microprocessor 200 to receive and act on command messages received from one of the central computers 100 even though a patient may have turned the receiver off.

The television receiver on/off switch 360 is actually a momentary push-button switch which may be located on the switch or control pad 234 (FIG. 2) provided for the TV receiver. A lead 361 connects switch 360 to an input of microprocessor 200 which repeatedly samples the switch and toggles an On/Off Flag each time the switch is actuated provided the system is not in a slave mode as subsequently described. When the flag is ON, the microprocessor produces a signal on a lead 202 which is connected to the base of a transistor 362. The relay 354 is connected in series with the transistor so that when switch 360 is closed the relay 354 is energized thus closing the contacts 354a and applying the DC output voltage of quadrupler 352 to the television receiver circuits.

As subsequently described, a program executed by microprocessor 200 may prevent actuation of the on/off switch 360 from changing the state of the On/Off Flag. Furthermore, microprocessor 200 may generate a signal on a lead 202 to turn transistor 362 on thereby energizing relay 354 and closing the contacts 354a even though the On/Off Flag is OFF.

The combined RF television signal, command message, and power signal is also applied to a filter 364 which filters out the power signal. The output of filter 364 is applied through a splitter 366 to the tuner (not shown) in the television receiver. The output of filter 364 is also applied to a filter 368 which passes the 75 MHz carrier modulated signal with the command message. An FM receiver 370 removes the command message from the carrier signal and applies it to an amplifier 372 which produces logic level voltages representing the command message. A timer 374 times the command message pulses and the resulting shaped command message pulses on lead 376 are applied to the microprocessor 200.

When transmitting data from a television set to a computer 100, the microprocessor 200 supplies the data pulses over a lead 204 to a voltage controlled oscillator 378 having a base frequency of 22.1 mhz. The data pulses modulate the frequency of the oscillator and the resulting output signal from the oscillator is applied through splitter 366 and filter 364 to the coaxial cable 124 (FIG. 1). The signal passes through directional coupler 116 to the controller module 104 which demodulates the signal and returns the data to the computer 100 which requested it.

The purpose of splitter 366 is to reduce the magnitude of the output signal from oscillator 378 as seen by the TV tuner. Splitter 366 reduces the magnitude of the oscillator output signal as seen by the TV tuner by about 20 db.

The signal D02 on lead 206 is produced, as subsequently described, once for each command message applied to the oscillator 378. The signal on lead 206 resets a timer 380 having an output connected to the gain control input of oscillator 378. If timer 380 should time out as a result of not receiving the signal D02 for a given length of time, it cuts down the gain of the oscillator 378, effectively cutting it off. This prevents the oscillator from hanging up the transmission line 118 (FIG. 1) in the event of a failure within the television set.

A circuit as illustrated in FIG. 2 is associated with each of the television sets 122. The circuit includes a microprocessor 200, a ROM 208, a non-volatile RAM 210, which includes an internal clock with a battery for back-up power, and a video character generator 212. The microprocessor may be a type 6803 and the video character generator may be a Fujitsu type MB88303.

An eight-bit data bus 214 is connected to ROM 208, NVRAM 210, a set of latches 216 and a set of three-state non-inverting bus transceivers 218. The bus transceivers 218 are connected to a port of microprocessor 200 which selectively supplies data or the eight low order bits of an address. This port is also connected to a set of transparent three-state inverting latches 220. The outputs of latches 220 are connected to an address bus 222. Microprocessor 200 has an address port through which it supplies eight bits of an address through a set of transparent three-state inverting latches 224 to the address bus 222. The four high order bits on the address bus are applied to a decoder 226 and the lower order 12 bits of an address are applied to ROM 208 and NVRAM 210. Depending upon the value of the four high order bits of an address, decoder 226 may produce an output signal on lead 228 to enable ROM 208, on lead 230 to enable NVRAM 210 or on lead 232 to enable latches 216.

FIG. 2 shows a TV switch pad 234. This switch pad is provided with the television receiver and, as indicated above, may be located on the front of the television set or on a pillow speaker unit connected to the receiver by a cable. The switch pad is modified so that only the Volume Up, Volume Down, Channel Up, Channel Down and Enter push-buttons are active. The switches associated with these push-buttons are disconnected from the TV receiver circuits and are connected to inputs of microprocessor 200. When a Channel Up, Channel Down, Volume Up or Volume Down push-button is actuated, a corresponding signal is supplied to the microprocessor 200. Actuation of the Enter push-button causes both a channel up and a channel down signal to be applied to the microprocessor. The Enter push-button is also referred to as the RENT button since it must be actuated by a patient (3 actuations) when he/she desires to watch a program on a premium channel.

The microprocessor 200 produces a signal AS on lead 234 to enable latches 220 when it is outputting an address on the leads 236. The microprocessor produces a signal R/W on lead 238 to control the reading or writing from NVRAM 210. The microprocessor produces a signal E on lead 240, and after inversion, this signal is applied to bus transceivers 218, ROM 208 and NVRAM 210 to enable data to be read out of ROM 208 or read out of or into NVRAM 210.

The system is capable of displaying a message of 160 characters overlaid on the video display on a screen of a television receiver. Data and addresses are supplied to the video character generator through latches 216. Simultaneously with the output of an address or data byte to the character generator, microprocessor 200 outputs an address through latches 224 which causes the decoder 226 to produce the signal CG on lead 232. This signal enables the address or data byte being passed from the microprocessor to pass through latches 216 to the character generator. To distinguish between data bytes to be displayed and the address at which they are to be displayed (position in the message displayed) the microprocessor 200 produces the signal LDI on lead 244 each time a data byte is being supplied.

The composite video signal from the television receiver is applied over a lead 246 to a sync signal processor 248 and a quad analog switch 250. The sync signal processor 248 removes the horizontal and vertical sync signals from the composite video signal and supplies them to the video character generator. The output of the video character generator is applied to the quad analog switch where it is mixed with the composite video signal and the resulting signal returned to the television receiver circuits.

The video character generator includes a port from which three signals D00, D01 and D02 may be issued. The signals D00 and D01 are connected through optical isolators to the tuner in the television receiver and are used to change the band or AFC. The signal D02 is applied to timer 380 (FIG. 3) as previously explained.

The microprocessor 200 generates the control codes for controlling the volume and channel selection of the television receiver. These codes, which simulate the codes generated by infrared remote control units, are stored in ROM 208. When the microprocessor desires to exercise a control over the television receiver, it retrieves the code from ROM 208 and serially transmits the code over a hard wired connection 252 to the tuner in the receiver.

Figure 4:
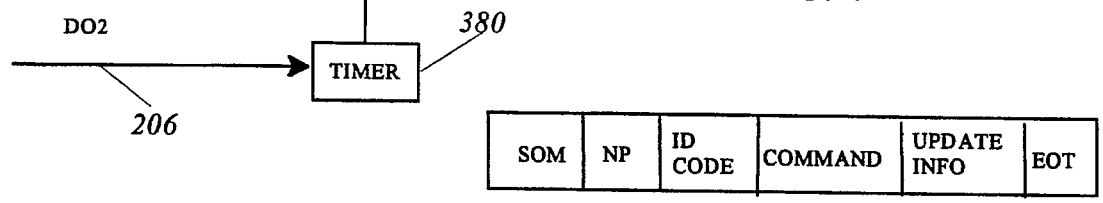
FIG. 4 shows the format of a command message.

FIG. 4 illustrates the format of command messages generated by a computer 100 and simultaneously received by microprocessors 200 in all of the TV sets, even though the patient may have turned his set off. The message includes a Start Of Message (SOM) byte which has the hexadecimal value FB, a Noise Protection byte which has the hexadecimal value A5, an ID field comprising two bytes, a command field comprising 30 bytes, an Update Info field having a variable number of bytes and including the information necessary for the microprocessors 200 to execute the specified command, and an end of transmission byte which has the hexadecimal value FC.

The ID field is in the nature of an address and defines which TV set or sets 122 is/are to carry out the command. One ID code specifies that all of the sets 122 are to act on the command. Provision is made for assigning the sets 122 to one or more of five groups and five ID codes specify these five groups. All other ID codes correspond to the address of an individual TV set 122.

The command field of the command message has one byte which contains the value 1 and the location of this byte within the 30 bytes of the command field determines which operation or command is to be executed. The byte position for each command is as follows:

| POSITION | COMMAND |
|---|---|
| 1 | Read Bill |
| 2 | Clear Bill |
| 3 | Write Bill |
| 4 | New Tier |
| 5 | Slave Mode |
| 6 | Reserved for Future Use |
| 7 | Send Address to Screen |
| 8 | Reserved for Future Use |
| 9 | Reserved For Future Use |
| 10 | Set Clock and Calendar |
| 11 | Change Band |
| 12 | Change AFC |
| 13 | Become a Member of Group(s) |
| 14 | Change Warning Message |
| 15 | Change Reserved Stations |
| 16 | Change Personal Address |
| 17 | Change Release Message |
| 18 | Change Hold Message |
| 19 | Set Preview Period |
| 20 | Change Preview Expired Message |
| 21 | Display New Message |
| 22 | Change Non-Rentable Message |
| 23 | Change Rent Type |
| 24 | Release Slave Mode |
| 25 | Load Timed Message |
| 26 | Reserved for Future Use |
| 27 | Reserved for Future Use |
| 28 | Reserved for Future Use |
| 29 | Reserved for Future Use |
| 30 | Initialize New NVRAM |

The Update Info field of a command message varies according to the command. The following summarizes the update information transmitted with each command.

| COMMAND | UPDATE INFO |
|---|---|
| Read bill | 1 byte. If byte = 1, TV returns current bill. Otherwise, TV returns back-up bill. |
| Clear bill | None. |
| Write bill | First byte of info package indicates bill type (1 = pay per minute, 2 = pay per view, 3 = pay per day). The rest is billing information including dates, times, channels, etc. Since the length of this information will vary from patient to patient (dependent only upon how many times he/she rented the TV), the end of this new billing info is designated by a hexadecimal FF. |
| New tier | Channel numbers of all channels the TV will be permitted to tune to, followed by hexadecimal FF. |
| Slave mode | Channel number, start hour, start minute, end hour, end minute, and hold/release byte (if byte = 1, slave & hold: If byte = 0, slave & release). |
| Send address to screen | None. |
| Set clock and calendar | Hour, day, date, month, year. |
| Change BAND | None. |
| Change AFC | None. |
| Become member of group | Five 2-byte codes. These codes are stored in the group memory cells. They can only consist of the following: |

-continued

| COMMAND | UPDATE INFO |
|---|---|
| | DEED - group 1<br>FACE - group 2<br>BABE - group 3<br>FEED - group 4<br>CAFE - group 5 |
| Change warning message | 160 bytes. This is the information that fills an 8 × 20 character screen. |
| Change reserved stations | The numbers of all premium channels, followed by hexadecimal FF. |
| Change personal address | New 2-byte ID code. |
| Change release message | 160 bytes. This is the information that fills an 8 × 20 character screen. |
| Change hold message | 160 bytes. This is the information that fills an 8 × 20 character screen. |
| Set preview period | 1 byte. This byte determines how long a patient can watch a premium station for free. The byte is expressed in 4-second intervals. For example, to give a patient a two minutes preview period, this byte would be decimal 30. |
| Change preview expired message | 160 bytes. This is the information that fills an 8 × 20 character screen. |
| Display new message | 160 bytes. This is the information that fills an 8 × 20 character screen. |
| Change non-rentable message | 160 bytes. This is the information that fills an 8 × 20 character screen. |
| Change rent type | 1 byte. If byte = 1, pay per minute. If byte = 2, pay per view. If byte = 3, pay per day. |
| Release slave mode | None. |
| Load time message | Hour, minute, and 160 byte message. |
| Initialize new NVRAM | None. |

Figure 5:
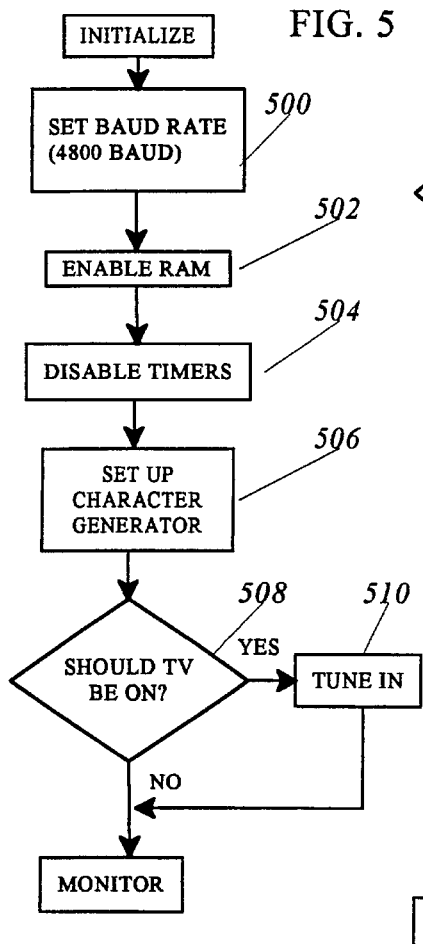
FIG. 5 illustrates the INITIALIZE routine executed by the microprocessor of FIG. 2.

When a TV set is initially connected by a cable 124 to an active power supply 120, or upon restoration of power after an outage so that +5V is available to power the microprocessor, the microprocessor executes a reset after which it executes an INITIALIZE routine as shown in FIG. 5. At step 500 the microprocessor accesses a memory location BAUD_RATE and uses the value stored therein to set up the baud transmission rate (4800). The microprocessor then enables its internal RAM (step 502) and disables its internal timers (step 504). At step 506 the microprocessor sends to the character generator 212 information selecting the size of the characters to be displayed in messages and where the messages are to start on the television screen. The message storage area of a memory within the character generator is cleared so that no message is displayed on the television screen.

At step 508 a location in NVRAM 210 holding the ON/OFF Flag 210 is tested to see if the television receiver should be on or off. Hospitals frequently shut off their primary source of power in order to check backup power generators. The television systems are not normally powered by the backup so all of the receivers shut down when the primary power is removed. At step 508, receivers which were on at the time primary power was shut down are turned back on when the power is restored. If step 508 indicates that the TV receiver was off prior to power shutdown then the program proceeds immediately to a MONITOR routine shown in FIG. 7 but if step 508 indicates that the TV receiver was on at the time of power shutdown then a TUNE IN routine is executed at step 510 before the program proceeds to the monitor routine.

Figure 6:
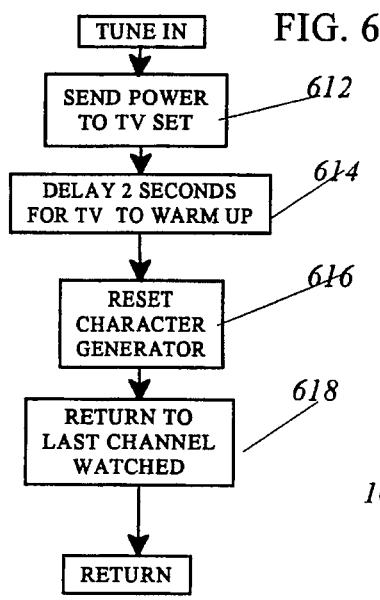
FIG. 6 illustrates the TUNE IN routine.

The TUNE IN routine is illustrated in FIG. 6. At step 612 the microprocessor generates the signal SLAVE on lead 202 and in FIG. 3 this signal turns on transistor 362 thereby energizing relay 354. The relay closes the contacts 354a so that power is applied to the receiver.

The microprocessor 200 then waits for two seconds (step 614) and then sets up the character generator 212 (step 616) as previously described. At step 618 location LAST_CH in NVRAM 210 is accessed. This location contains a channel number and is updated each time a new channel is selected. The channel number is used by the microprocessor 200 to generate a code on lead 252 to control the tuner to select the channel. Thus, after a power shut-down the TV receiver is tuned to the same channel that was being viewed at the time of the shut-down. After step 618 is executed the TUNE IN routine returns to the routine from which it was called, in this case the INITIALIZE routine. The INITIALIZE routine then advances to the MONITOR routine shown in FIG. 7.

All microprocessors 200 receive and store every command message generated by any of the computers 100. Each time a microprocessor 200 receives a complete byte of a command message it interrupts the routine it is executing, stores the received byte in NVRAM 210, and returns to the interrupted routine at the point where it was interrupted.

In the MONITOR routine, a microprocessor 200 repeatedly executes steps 720 through 729 waiting for the receipt of a complete message, the time to display a time message, the time to initiate or terminate the slave mode, or operation of a button on switch pad 234. Assume that at step 720 the microprocessor checks the location in NVRAM 210 which stores the End 0f Transmission flag and finds that the flag has been set because an EOT byte of a command message has been received. At step 730 the microprocessor executes a PROCESS routine to determine if the received command message is intended for this TV set, and, if so, analyze the command field and carry out the operations necessary to accomplish the command.

Figure 8A:
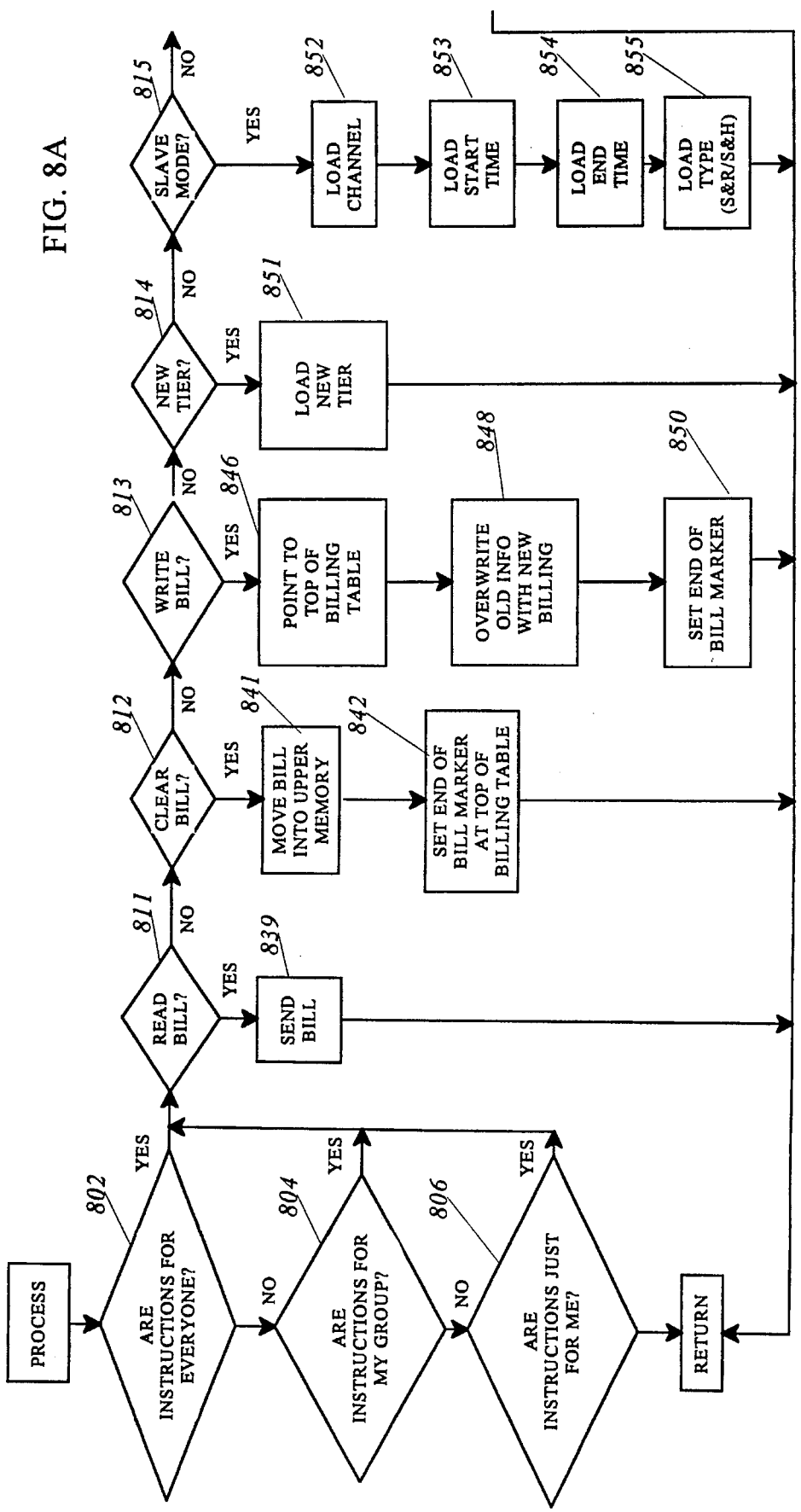
FIGS. 8A and 8B illustrate the PROCESS routine for analyzing command messages.
Figures 1, 8A:
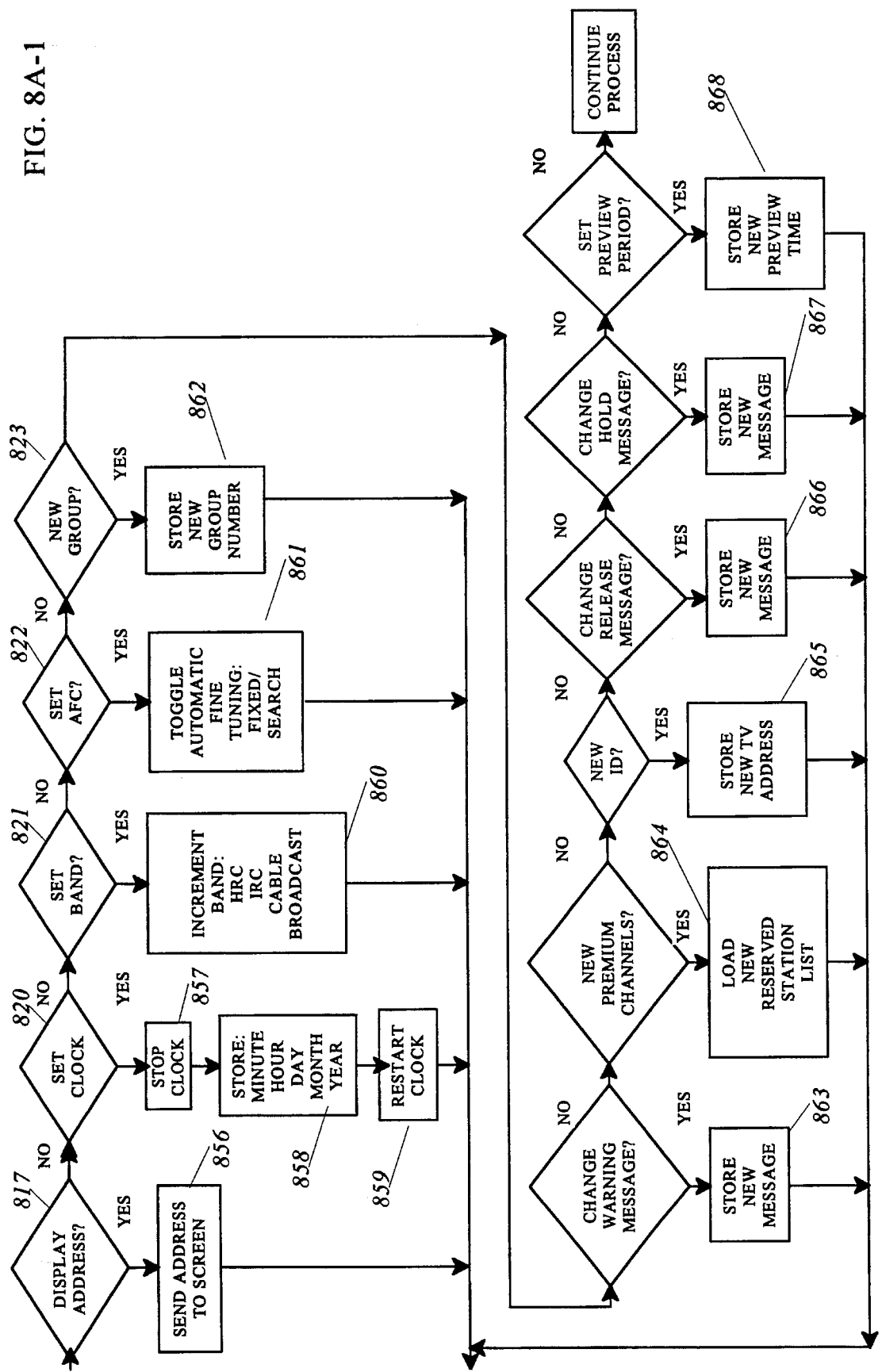
Figure 8B:
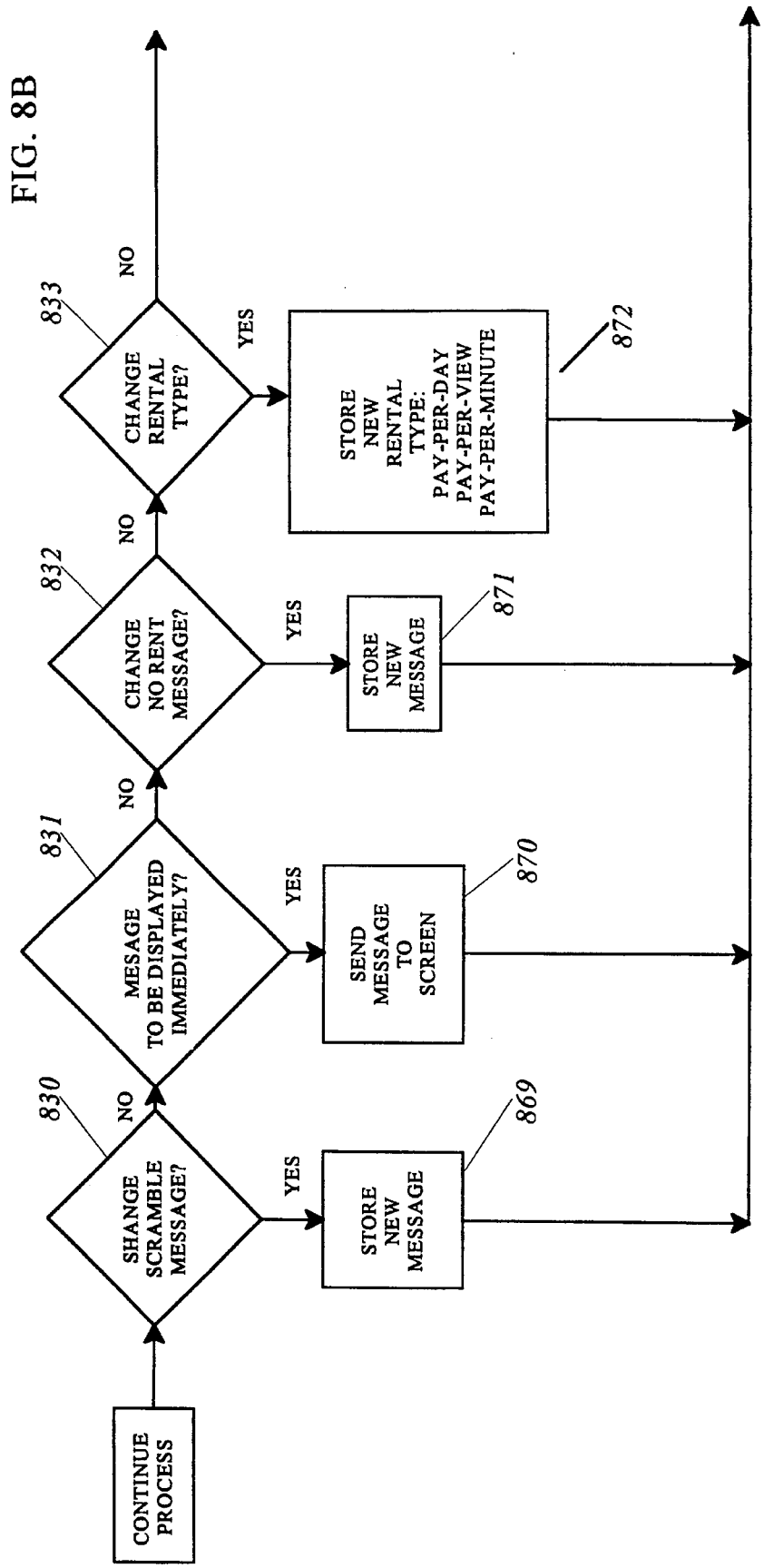
Figures 1, 8B:
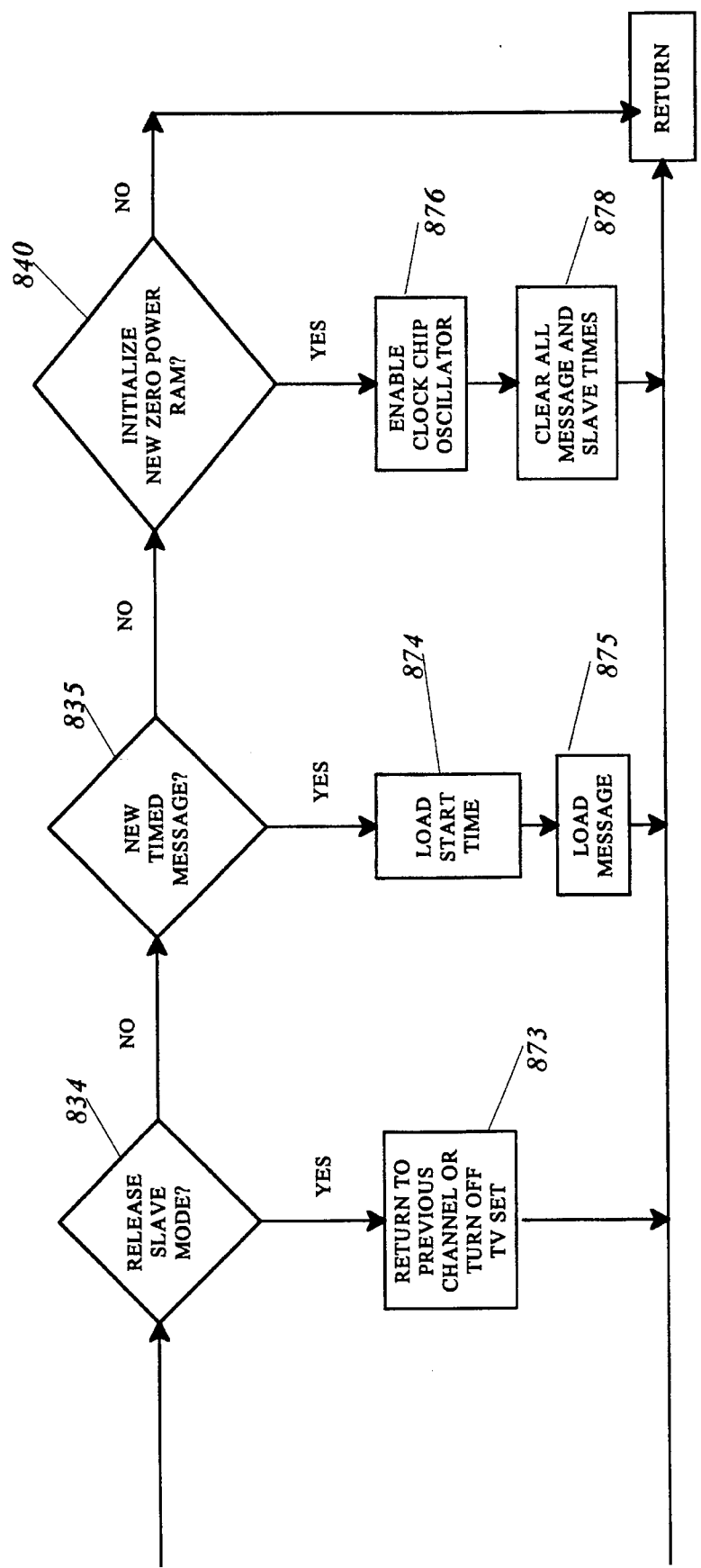

The PROCESS routine is illustrated in FIGS. 8A and 8B. In FIG. 8A, the ID code from the command message is retrieved from memory and tested at step 802 to see if it specifies that the command is to be carried out by the microprocessors in all of the TV sets. If not, then step 804 is executed to determine if the ID code specifies a group to which the TV receiver associated with the microprocessor has been assigned. If not then step 806 is executed to determine if the ID code from the command message is equal to the address of this TV set as stored in the NVRAM 210. If not, then no action is required in response to this command. The EOT flag is cleared and a return is made to the MONITOR routine at step 721.

If any of the tests at steps 802, 804 or 806 proves true then the microprocessor checks the 30 bytes from the command field of the command message looking for the byte which contains a 1. When the byte containing a 1 is found, then the operations required for that command are executed and the program returns to the MONITOR routine without checking the remaining bytes. The 30 bytes are sequentially checked at steps 811 through 840. FIGS. 8A and 8B do not show steps 816, 818, 819 and 836–839 because the bytes checked at these steps are reserved for future use and always contain a zero.

At step 811 byte 1 is tested and if it contains a 1 then the requested billing information is retrieved from NVRAM 210 and transmitted (step 839) through modem 126 back to the computer 100 which issued the command message. The billing information set back to the computer may be either current billing information or prior billing information depending upon whether the Update Info field of the command message contained a 1 or a 0. If the Update Info field contains a 1 then the current billing information is transferred from a billing table in the memory to the computer but if the Update Info field contains a 0 then billing information relating to a prior cleared bill is transferred from a higher memory location to the computer.

If the test at step 811 proves false, step 812 tests the second byte of the Command field to see if the command is to clear the billing information. If the test proves true then the billing information is transferred (step 841) from the billing table into upper memory locations so that the billing information will not be lost if there should be a malfunction during transmission of information back to the computer. After the billing information is moved into upper memory, step 842 is executed to set an end of bill marker at the of the billing table.

If the test at step 812 proves false then byte 3 of the Command field is tested at step 813 to see if the command is to write billing information into the billing table. If the test proves true then a pointer is set to point to the top of the billing table (step 846) and the new billing information from the Update Info field of the command message is written over any billing information in the billing table (step 848). An End of Bill marker is set (step 850) to indicate the last address of the billing table containing new billing information.

The command codes described thus far permit billing information accumulated in one TV set to be transferred to a TV set in another room in the event a patient should be moved. An operator at one of the computers 100 keys in the ID code of the TV set in the room being vacated, selects the Read Bill command, and keys in an indication that the current bill is required. The operator then presses a key to transmit the command message to the TV set which then returns the billing information to the computer 100 which requested it.

The operator then keys in the ID code of the TV set in the new room again together with a Write Bill command. The computer inserts the billing information obtained in response to the Read Bill command into the Update Info field of the Write Bill command and the command message is transmitted to the TV set in the new room thus completing the transfer of the billing information from the TV set in the old room to the set in the new room.

If the test at step 812 should prove false then step 814 checks the fourth byte of the command field and if this byte contains a 1 then step 851 is executed to load into a tier table in memory the channel numbers from the Update Info field of the command message. This table defines the only channels to which the television receiver may be tuned. When the Channel Up or Channel Down push-button on TV switch pad 234 is pressed, the number of the channel currently selected is incremented/decremented and the new value compared with the table. If the new value is not found in the table then the new value is itself incremented/decremented until a new value is obtained which matches one of the values in the tier table. Successive depressions of a button thus cause successive channels defined by the tier table to be selected.

If the test at step 814 proves false then step 815 tests the fifth byte of the command to see if it contains a 1. If it does then the command message specifies a Slave command. A slave command enables a computer 100 to take control of any of the TV sets 122 to which the command is addressed. If the television receiver is off, the command causes the microprocessor 200 to turn the television receiver on and off at times which are specified in the Update Info field of the Slave command message. The command also causes the TV receiver to be tuned to a specific channel specified in the Update Info field of the command during the interval between the on and off times.

The Slave command is used when, for example, it is desired that a patient view a particular program which may be a video taped explanation of an operation procedure he is about to undergo, an illustration of rehabilitation procedures, etc. The slave command may be one of two types: Slave and Hold or Slave and Release. The type is specified by one byte in the Update Info field of the command. A Slave and Hold command exercises absolute control over the TV receiver. It turns the receiver on and tunes the receiver to the specified channel at a start time specified in the command. At an end time specified in the command, control is relinquished and the receiver is returned to the channel which was last viewed prior to the start time.

A Slave and Release command functions in much the same manner except that the patient may terminate the slave mode by depressing the ENTER button on switch pad 234. The Update Info from the command message is saved to specific locations in memory. The number of the channel to which the TV set is to be tuned is saved at step 852, the start time at which the channel is to be selected is saved at step 853, the end time is saved at step 854, and the type of the slave command (Slave and Release or Slave and Hold) is saved at step 855.

If the test at step 815 proves false then at step 817 the seventh byte of the Command field is tested for a 1. If the byte contains a 1 then the microprocessor 200 retrieves the address of the television set from NVRAM 210 at step 856 and sends it to the video character generator 212 so that the address is displayed on the screen. This command is used primarily for maintenance purposes.

If the test at step 817 proves false then at step 820 the tenth byte of the command message is checked for a 1. If the byte contains a 1 then the microprocessor stops the clock in NVRAM 210 (step 857) and loads the clock with the hour, day, date, month and year from the Update Info field of the command message (step 858). The microprocessor then restarts the clock (step 859) and returns to the MONITOR routine.

If the test at step 820 proves false, the eleventh byte from the Command field is tested at step 821. If it contains a 1, microprocessor 202 increments a counter and uses the count to send a code over lead 252 to the tuner to advance the band selection by one band.

If the test at step 821 proves false, the twelfth byte from the Command field is tested at step 822 and if it contains a 1, the microprocessor sends a code over lead 252 to toggle a flag which controls the fixed/search mode of the AFT.

If the test at step 822 proves false then at step 823 the microprocessor checks the thirteenth byte from the Command field to see if it contains a 1. If it does, then at step 862 the microprocessor stores the 2-byte codes from the Update Info field of the command message in memory. After these numbers are stored the TV set will act on any command message containing an ID code which, when compared at step 804 with the stored group codes, is found to be equal to one of them.

If the test at step 823 proves false then at step 824 the microprocessor checks byte 14 of the Command field to see if it contains a 1. If it does, then at step 863 a 160-byte warning message from the Update Info field of the command is stored in memory and a return is made to the MONITOR routine. As explained below, this warning message is subsequently displayed on the TV screen to warn a patient that he/she has tuned into a premium channel. Preferably, this message also contains instructions to the patient on how he may rent the television set.

If the test at step 824 proves false then at step 825 the fifteenth byte from the Command field is tested for a 1. If the test proves true, then at step 864 the channel numbers transmitted in the Update Info field of the command message are stored in memory. These channel numbers specify the premium channels, that is, those channels for which the patient will be billed if he should rent them.

If the test at step 825 proves false then at step 826 the sixteenth byte of the Command field is tested for a 1. If the byte contains a 1 then at step 865 the 2-byte ID codes from the Update Info field of the command message are stored in memory. After these new ID codes are stored, the TV set will act on any subsequent command messages having an ID code field equal to any one of these stored codes when, at step 806 the two are compared and found equal.

If the test at step 826 proves false then at step 827 byte 17 from the Command field of the message is tested for a 1. If the byte contains a 1 then at step 866 a "release" message from the Update Info field of the command message is saved in memory. The saved message is not immediately displayed on the TV screen. It is displayed only if the TV set is in the Slave and Release mode and the patient presses one of the push-buttons on the TV switch pad 234. The message should inform the patient that the current program is strongly suggested, but can be turned off by pressing the Enter button.

If the test at step 827 proves false then at step 828 the eighteenth byte of the Command field from the command message is tested for a 1. If it contains a 1 then at step 867 a new "hold" message which was transmitted in the Update Info field of the command message is saved in memory. The message is not immediately displayed. It is subsequently displayed when the TV set is in the slave and hold mode and the patient tries to change channels. This message informs the patient that the current program is mandatory and that it will not be possible to change channels or turn the set off until the hold time has expired.

If the test at step 828 proves false then at step 829 byte 19 from the Command field is tested for a 1. If it contains a 1 then at step 868 the microprocessor saves in memory the byte from the Update Info field of the command message. This byte is subsequently used to control a preview period, that is, the period during which a patient can watch a premium channel without charge.

If the test at step 829 proves false then at step 830 (Fig. 8B) byte 20 from the Command field is tested for a 1. If it contains a 1 then at step 869 the message from the Update Info field of the command message is saved in memory. This message will subsequently be displayed on the television screen when a preview period has expired. This message should inform the patient that the preview period has expired and should also contain an instruction that he/she may rent the TV set by pressing the Enter button three times.

If the test at step 830 proves false then at step 831 byte 21 from the Command field is tested for a 1. If the byte contains a 1 then at step 870 the message from the Update Info field of the command message is sent to the video character generator 212 so that it is immediately displayed on the TV screen. The message may contain any information (up to 160 bytes) which it is desired to convey to the patient. This message will remain on the TV screen until the patient presses the Enter button on TV switch pad 234.

If the test at step 831 proves false then at step 832 byte 22 from the Command field is tested for a 1. If it contains a 1 then at step 871 the message from the Update Info field is saved in memory. The message is not immediately displayed. It is subsequently displayed if the TV set becomes unrentable because its billing table is full.

If the test at step 832 proves false then at step 833 byte 23 from the Command field is tested for a 1. If it contains a 1 then at step 872 the byte from the Update Info field of the command message representing the new rental type is saved in memory. The charge for viewing may be based on a per-day, per-view or per-minute rate.

If the test at step 833 proves false then at step 834 byte 24 from the Command field is tested for a 1. If it contains a 1 then at step 873 the slave mode is terminated. The microprocessor terminates the signal Slave on lead 202 if the On/Off Flag is off so that the TV set is turned off. If the On/Off Flag is on, the signal on lead 202 is not terminated and the television receiver remains on. The microprocessor also retrieves from memory the channel number of the channel last tuned to and this value is then used to transmit signals over lead 252 to the tuner so that the TV set is tuned in to the channel which the patient was viewing at the time the Slave mode was initiated.

Figure 7:
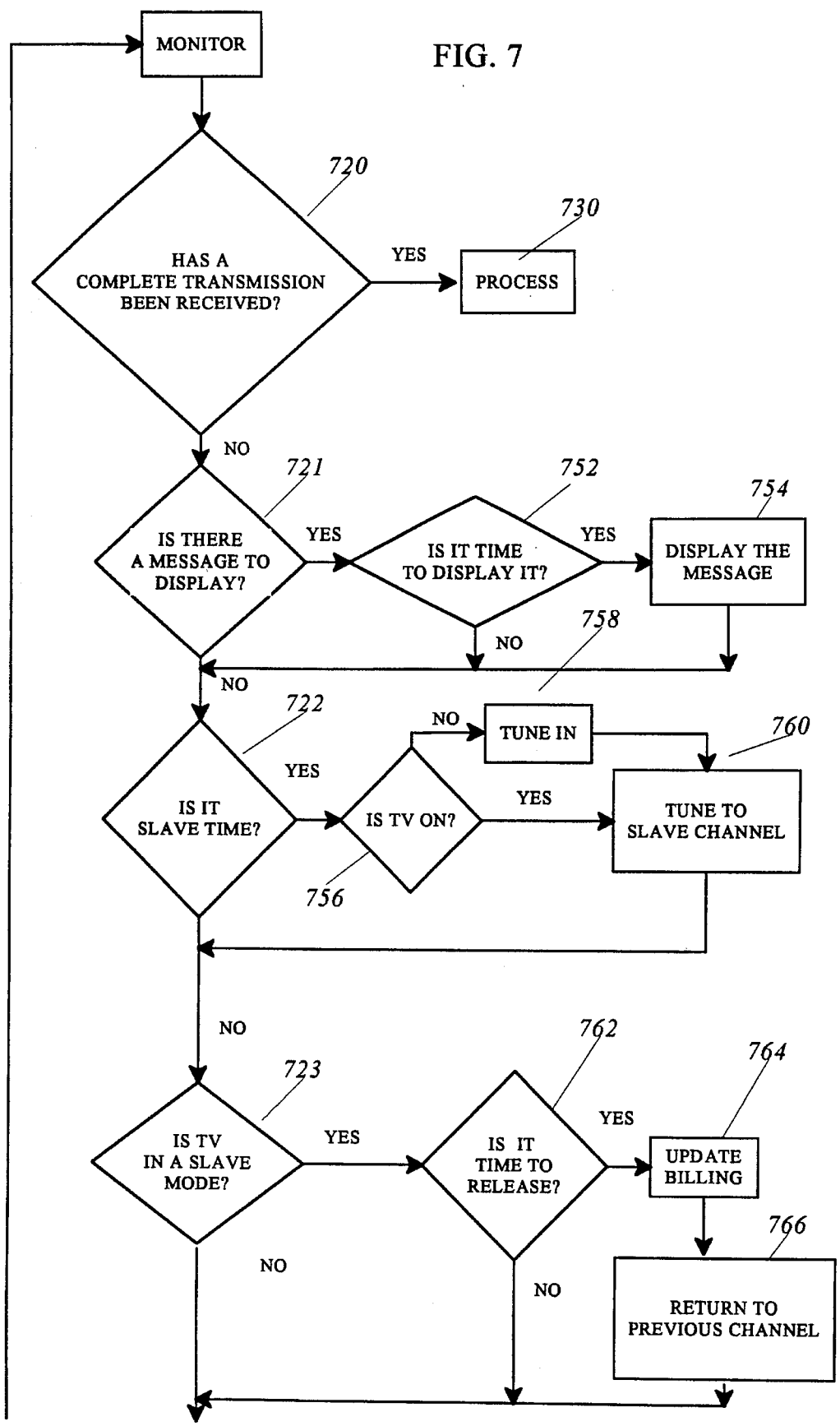
FIG. 7 illustrates a MONITOR routine.
Figure 7A:
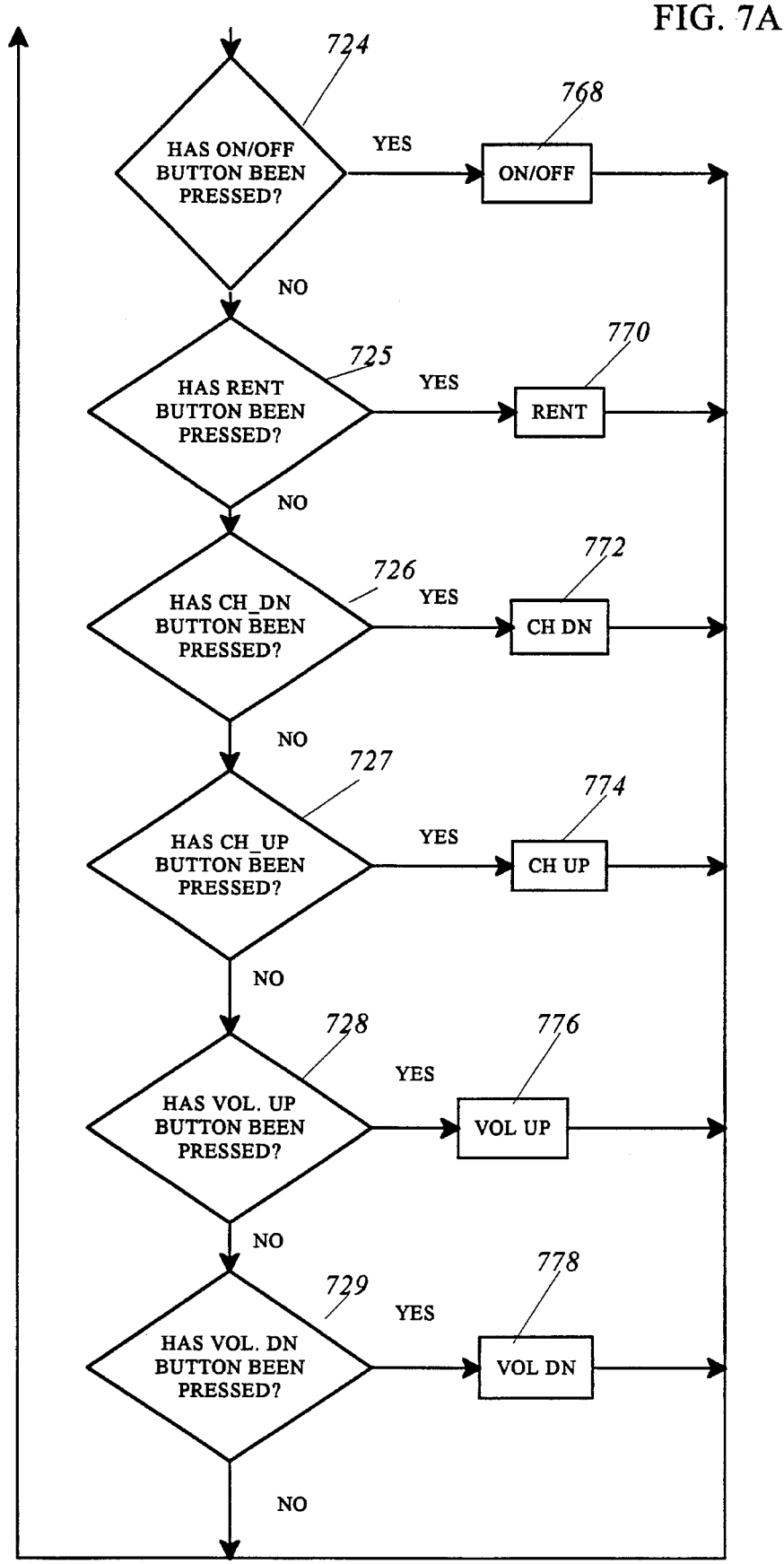

If the test at step 834 proves false then at step 835 byte 25 from the Command field is tested for a 1. If it contains a 1 then the start time and the message from the Update Info field are saved in memory. The start time, which indicates the time at which the message is to be displayed, is saved at step 874. The message is saved at step 875 and a message flag is set. This message flag is tested each time the MONITOR routine of FIG. 7 is executed, and when set it causes the message start time to be compared with the current time. When the start time occurs the microprocessor sends the message from memory to the video character generator 212 so that it is displayed on the TV screen. The message remains on the screen until the patient presses the Enter button on the TV switch pad 234.

If the test at step 835 proves false then at step 840 byte 30 from the Command field is tested for a 1. If it does not contain a 1 then a return is made to the monitor routine shown in FIG. 7. If the thirtieth byte does contain a 1 then the oscillator which drives the clock on the NVRAM chip is enabled at step 876, and all of the locations storing message times and slave times are cleared at step 878. Steps 876–878 are executed as part of a maintenance routine. The RAM and oscillator for the clock/calendar contained within the NVRAM 210 are powered by a backup battery in case of a normal power failure. The oscillator and RAM may be software disabled to conserve power in case the chip is to be stored for long periods of time. When shipped from the manufacturer, the oscillator is normally turned off. Step 876 turns the oscillator on. When the oscillator is turned on the clock does not indicate the correct time. Therefore, step 878 clears all stored times for timing the display of messages or timing the start or termination of the slave mode. After the timers are cleared, a command message with a 1 in byte 10 (Set Clock) is sent to the microprocessor 200 to set the clock to the correct time.

Returning to the MONITOR routine of FIG. 7, assume that the test at step 720 has proved false, or, if true, the command has been analyzed by the PROCESS routine as described above. At step 721 the Message flag is checked to see if there is a timed message to be displayed. This flag is set at step 875 of the PROCESS routine when the timed message is saved in memory. If the flag is set then the Load Start Time saved at step 874 is checked at step 752 to determine if it is time to display the message. If it is time to display the message the microprocessor transfers the message from memory to the video character generator 212 so that it is displayed (step 754) on the TV screen. After the message is sent to the video character generator the program advances to step 722. If the test at step 752 indicates that it is not time to display the message then the program advances directly from step 752 to step 722.

At step 722 the microprocessor compares the present time, obtained from the internal clock, to the slave start time saved at step 853. If the present time is later than or equal to the start time, the program branches to step 756 where the microprocessor checks the On/Off Flag. If the flag is ON the program moves directly from step 756 to step 760. On the other hand, if the flag is OFF then the TUNE IN routine is executed at step 758 as previously described with reference to FIG. 6 to turn the TV receiver on. At step 760 the microprocessor outputs a signal on lead 252 to the tuner in the TV receiver to tune the receiver to the channel number saved in memory at step 852. The channel is thus changed from one the patient may have selected to the one specified in a slave command message.

If the test at step 722 indicates that it is not time for the slave mode of operation, or after step 760 tunes the receiver to the slave channel, the program executes step 723 to determine if the TV is in a slave mode. If the TV set is in the slave mode then step 762 is executed to determine if it is time to release the slave mode. This is done by comparing the present time from the internal clock with the end time stored at step 854 of the PROCESS routine.

If the TV is not in a slave mode the program advances from step 723 to step 724 and if it is in the slave mode but not time for the slave mode to be released the program advances from step 762 to step 724.

If the test at step 762 indicates that the slave mode interval has expired then an UPDATE BILLING routine is executed at step 764 and at step 766 the microprocessor retrieves from memory the indication of the channel the receiver was tuned to at the time the slave mode began. This indication is then used to generate signals on lead 252 to control the tuner in the TV receiver to tune it to the channel which was being watched at the time the Slave mode was initiated. After execution of step 766 the program proceeds to step 724.

At step 724 the microprocessor checks to see if the On/Off push-button has been pressed. In this regard, each time the MONITOR routine is executed the signal on lead 361 is sampled and the On/Off Flag is set to indicate whether the TV is on or off. On the next succeeding execution of the MONITOR routine the current signal on lead 361 is compared with the flag to determine if the button has been depressed. If the button has been depressed then an ON/OFF routine (FIG. 9) is executed at step 768 and the program returns to the start of the MONITOR routine.

If the test at step 724 shows that the On/Off push-button has not been pressed then step 725 is executed to determine if the Rent (Enter) button has been pressed. If it has, a RENT routine (FIG. 11) is executed at step 770 before the program returns to the start of the MONITOR routine. However, if step 725 indicates that the Rent button has not been pressed then step 726 is executed to determine if the Channel Down button on switch pad 234 has been pressed. If it has, the CHANNEL DOWN routine (FIG.12) is executed at step 772 before a return is made to the start of the MONITOR routine.

If the Channel Down button has not been pressed then step 727 determines if the Channel Up button has been pressed. If it has, than the CHANNEL UP routine (FIG. 12) is executed at step 774 before a return is made to the start of the MONITOR routine.

If the Channel Up button has not been pressed then step 728 determines if the Volume Up button has been pressed. If it has, a VOLUME UP routine is executed at step 776. During execution of this routine the microprocessor sends signals over lead 252 to increases the sound volume on the TV receiver.

If the Volume Up button has not been pressed then step 729 tests the Volume Down button. If the Volume Down button has been depressed then a VOLUME DOWN routine is executed during which the microprocessor sends signals over lead 252 to reduce the sound volume of the TV receiver. If the Volume Down button has not been depressed then the program loops back from step 729 to step 720 and the MONITOR routine is repeated.

Figure 9:
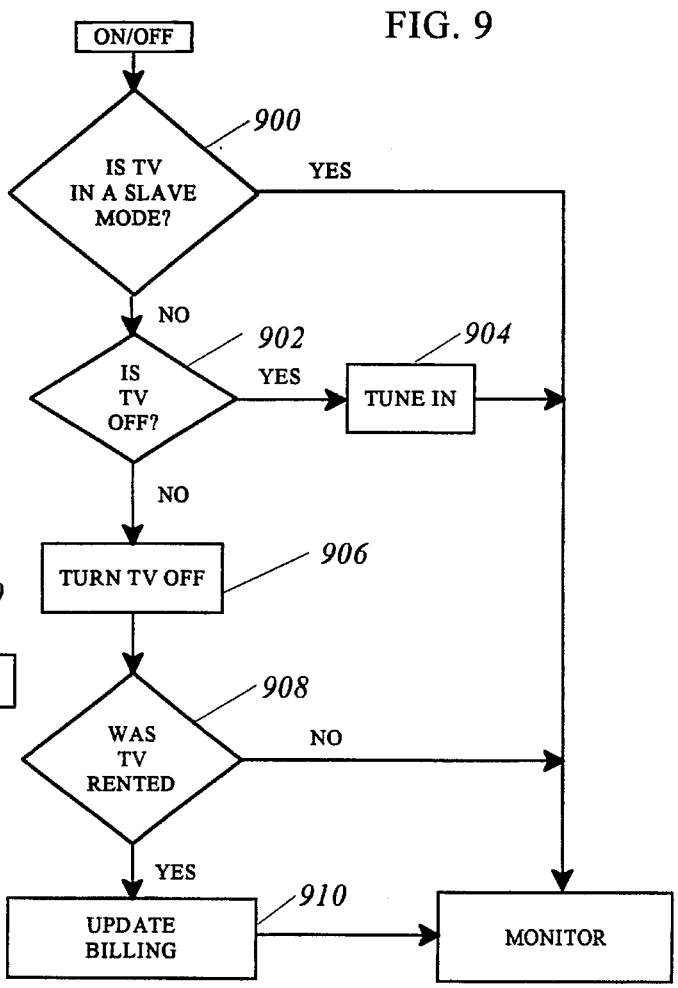
FIG. 9 illustrates an ON/OFF routine.

FIG. 9 illustrates the ON/OFF routine represented at step 768 of the MONITOR routine. At step 900 the microprocessor checks to see if the slave mode is in effect. If the slave mode is in effect the only button the patient may use is the Enter button. From step 900 the program returns to the MONITOR routine.

If the slave mode is not in effect step 902 samples the On/Off flag to determine if the TV is off. If it is, the TUNE IN routine is executed at step 904 as previously described with reference to FIG. 7 to turn the TV on and tune it to the channel which was being watched at the time the TV set was turned off. A return is then made to the MONITOR routine. If step 902 indicates that the TV is not off then it is turned off at step 906 by terminating the signal on lead 202 and resetting the On/Off flag.

At step 908 a Rent flag is tested to see if the TV set was on rental at the time it was turned off. The Rent flag is set during execution of a RENT routine as subsequently described. If the TV was not on rental then the program returns to the MONITOR routine from step 908. However, if the set was on rental an UPDATE BILLING routine is executed at step 910 before a return is made to the MONITOR routine.

Figure 10:
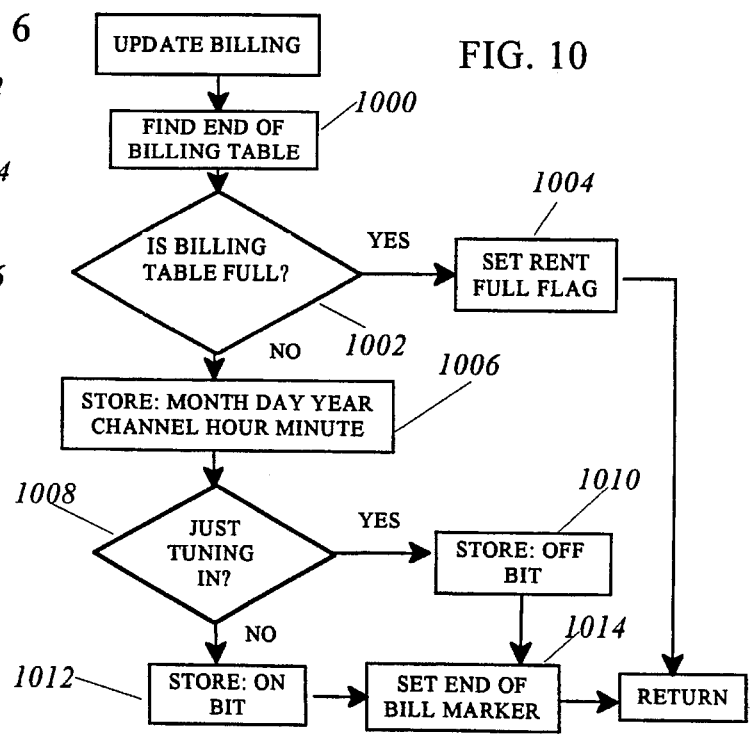
FIG. 10 illustrates the UPDATE BILLING routine.

FIG. 10 illustrates the UPDATE BILLING routine. At step 1000 the microprocessor checks sequentially the addresses in memory assigned to storage of the billing table to locate an End of Bill marker indicating the last address containing billing information. At step 1002, the memory location in which the End of Bill marker was found is checked to determine if it is the last address in the table. If it is, the rent table can accept no more billing information so a Rent Full flag is set at step 1004 and a return is made to the program from which the UPDATE BILLING routine was entered.

If the test at step 1002 indicates that the billing table is not full then at step 1006 an entry is made into the billing table of the month, day, year, hour and minute as well as the channel number rented. At step 1008 a Rent flag is tested. This flag will be off if the patient is just renting the channel. If the flag is off then step 1010 stores an on bit in the flag and if the Rent flag is on an off bit is stored at step 1012. The End of Bill marker is then set at step 1014 after which a return is made to the routine from which the UPDATE BILLING routine was entered.

Figure 11:
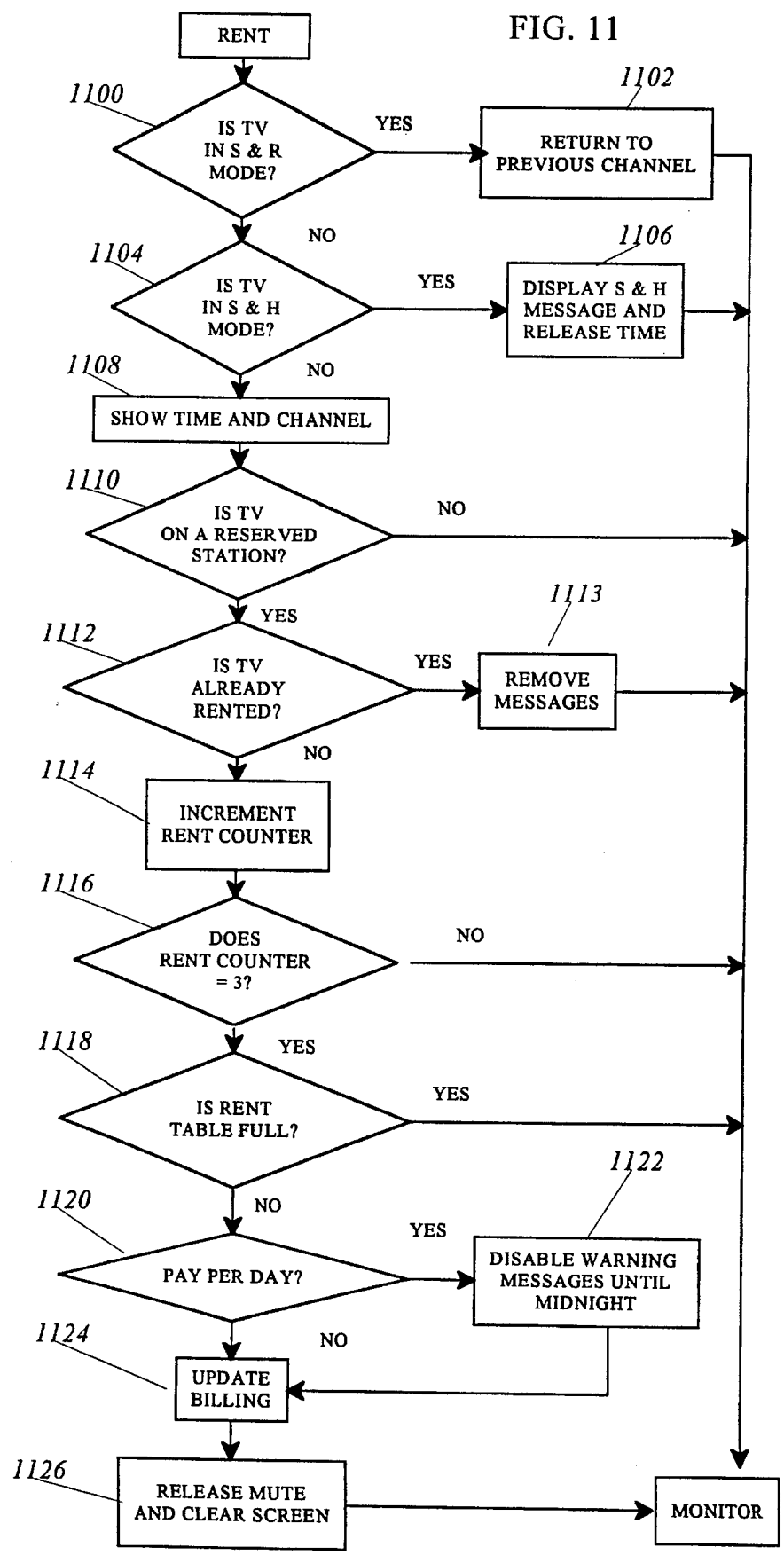
FIG. 11 illustrates the RENT routine.

The RENT routine is shown in FIG. 11. This routine is executed each time the MONITOR routine is executed and step 725 indicates that the Rent (Enter) button has been pressed. At step 1100, a test is made to see if the TV is in the slave mode and, if so, if the Hold/Release byte is a zero, indicating the Release mode. If the test proves true, the memory location storing the number of the last channel selected for viewing is accessed at step 1102 and the microprocessor outputs signals over lead 252 to set the receiver tuner to the channel which was being viewed at the time the slave mode was initiated. The program then returns to the MONITOR routine. The first pressing of the Enter button merely clears the slave mode if the slave and release mode is in effect.

If the test at step 1100 proves false then the microprocessor executes step 1104 to determine if the TV set is in the slave mode and, if so, the Hold/Release byte is a 1, indicating the Hold mode. If the set is in the Slave and Hold mode, the patient is not permitted to change to a premium channel. At step 1106 the microprocessor sends to the character generator 212 the slave and hold message saved in memory at step 867 and the mode end time saved at step 854. A return is then made to the MONITOR routine.

When the test at step 1104 proves false, the microprocessor, at step 1008, sends to video character generator 212 a message comprising the current time obtained from the internal clock in the NVRAM 210, and the channel number presently selected so that this information appears on the patient's TV screen.

Step 1110 compares the presently selected channel number with the numbers of all the premium channels loaded into memory the last time step 864 was executed. If the selected channel number is not equal to any premium channel number, there is no charge for viewing the channel. From step 1110 the program returns to the MONITOR routine.

If step 1110 indicates that the presently selected channel is a premium channel, a Rent Flag is tested at step 1112. This flag is set if the TV set is already rented. If the flag is set, the microprocessor 200 clears any message in character generator 212 so that it is removed from the TV screen.

If the TV is not rented, a Rent Counter is incremented by one at step 1114 and the counter is tested at step 1116 to see if it contains a count of 3, indicating the Rent button has been pressed three times. When the TV set is not in the slave mode, three actuations of the Rent button are required to rent the set. Assuming that the counter does contain a count of three, the program returns to the MONITOR routine and looks for another actuation of the Rent button.

If the Rent Counter contains a count of three, step 1118 checks the Rent Full flag to determine if the billing table is full and cannot accept more billing information. If the flag is set, the program returns to the MONITOR routine since the TV set is unavailable for rental.

If the set is available for rental, the microprocessor accesses (step 1120) the billing rate which was stored the last time step 872 of the PROCESS routine was executed. If the billing rate is on a pay-per-day basis, a Warn Flag is disabled at step 1122. This flag when disabled, prevents the rental warning message from being displayed for the remainder of a day if a premium channel is selected and the free preview period has expired. After either step 1120 or 1122, the program advances to the UPDATE BILLING routine described above to update the billing table.

Upon completion of the UPDATE BILLING routine, the microprocessor sends a coded signal (step 1126) over lead 252 to terminate muting of the sound. The microprocessor also clears the character generator 212 so that no messages are displayed, and a return is made to the MONITOR routine.

Figure 12:
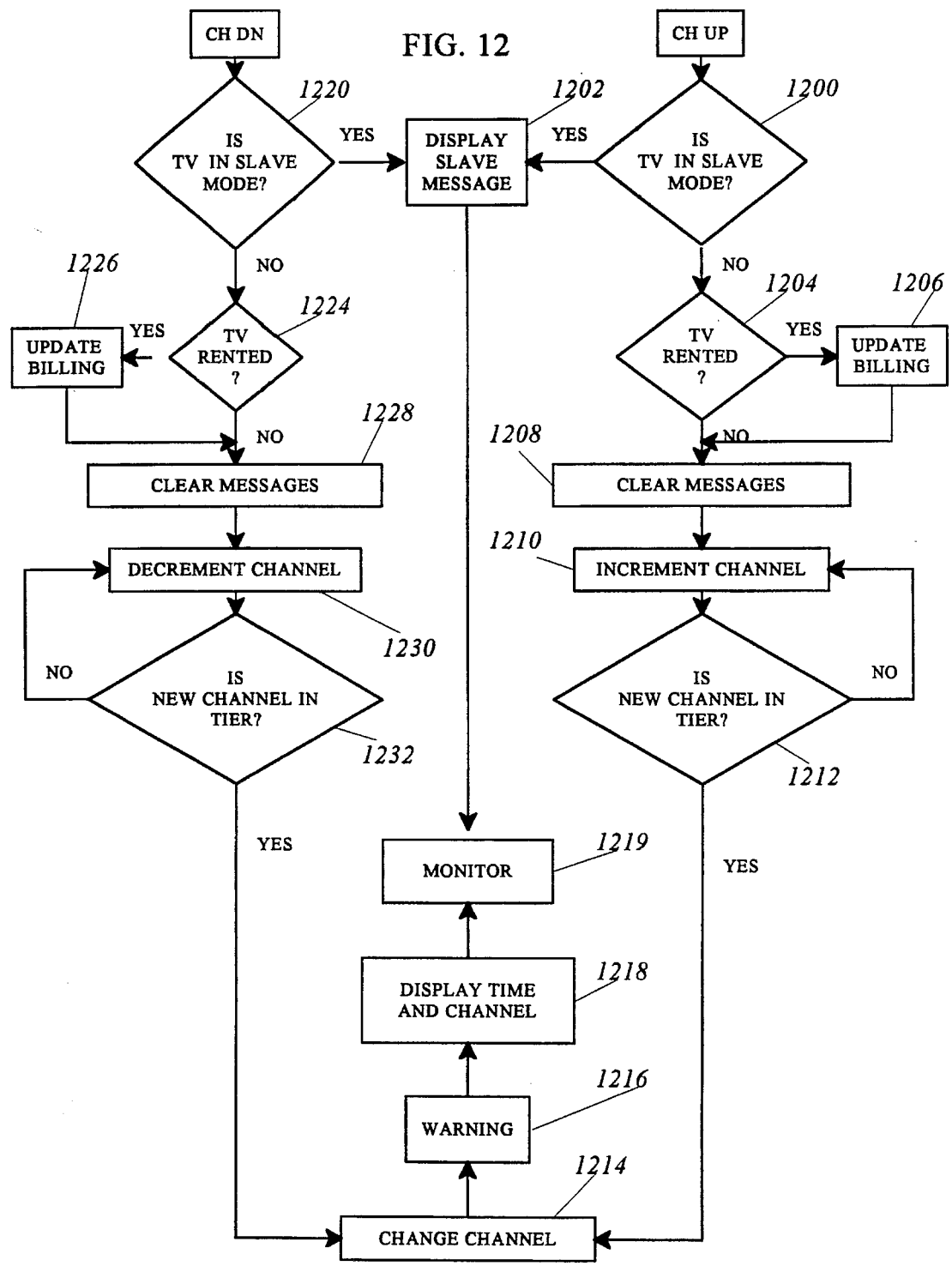
FIG. 12 illustrates the CHANNEL UP and CHANNEL DOWN routines.

FIG. 12 shows the CHANNEL UP and CHANNEL DOWN routines represented by steps 774 and 772 of the MONITOR routine. If the patient has pressed the Channel Up button, then the CHANNEL UP routine is entered at step 1200 where a test is made to see if the Slave mode flag is set. If it is, then at step 1202 either the slave and hold message saved at stp 867 or the slave and release message saved at step 866 is sent to character generator 212 for display, and a return is made to the MONITOR routine.

If step 1200 indicates that the TV set is not in the Slave mode, the Rent Flag is tested at step 1204 to see if the TV set is rented, that is, if the channel which is being switched from is a premium channel on rental. If it is, the UPDATE BILLING routine is executed at step 1206 and the program moves to step 1208. If the TV set is not on rental, the program advances directly from step 1204 to step 1208.

The character generator is cleared of any messages at step 1208 and the location storing the channel number is incremented at step 1210. At step 1212 the incremented channel number is compared with the channel numbers of the channels in the tier which were saved at step 851 of the PROCESS routine. If the incremented channel number is not in the tier, the program returns to step 1210 to again increment the channel number. Steps 1210 and 1212 are repeated until step 1212 detects that the incremented channel number is in the tier and is thus a channel available for viewing. A code is then sent over lead 252 (step 1214) to tune the receiver to the new channel. Next, a WARNING routine is executed at step 1216 as subsequently described to warn the patient if the newly selected channel is a premium channel. After the WARNING routine is completed, the microprocessor sends the current time and channel number to character generator 212 so that it is displayed (step 1218) on the TV screen. The program then returns to the MONITOR routine.

The CHANNEL DOWN routine is similar to the CHANNEL UP routine and its execution should be obvious from FIG. 12 and the foregoing description. The only difference is that at step 1230 the channel number is decremented rather than incremented as at step 1210.

Figure 13:
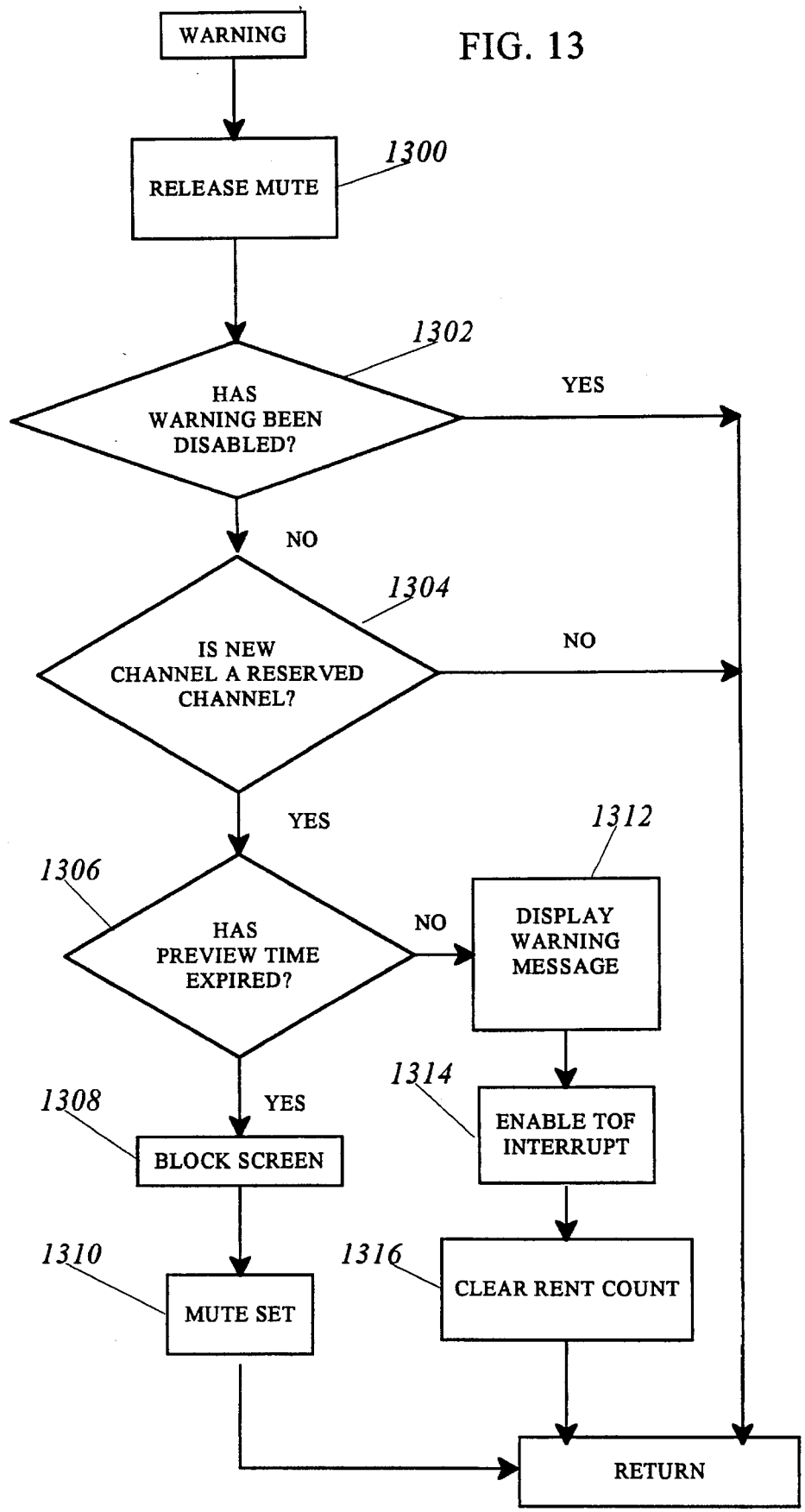
FIG. 13 illustrates the WARNING routine.

FIG. 13 illustrates the WARNING routine. The purpose of this routine is to display a message warning the patient if he is tuned to a premium channel, and instructing him how to rent the channel. If a premium channel has been selected, the WARNING routine also initiates a timer to time a preview interval during which the patient may view the premium channel free of charge.

At step 1300, the microprocessor sends a code over lead 252 to terminate muting of the sound in the television receiver. At step 1302 the warning message flag is checked to see if warning messages are to be blocked from the TV screen. This flag is set at step 1122 of the RENT routine and will be on if the patient has previously rented the set this day and he is being charged on a per-day basis. If step 1302 shows that the warning message flag is set, the program returns to the CHANNEL/UP CHANNEL/DOWN routine of FIG. 12.

If the warning message flag is not set, the newly selected channel number is compared (step 1304) with the channel numbers entered into the premium channel table at step 851 and if the selected channel is not a premium channel the program returns to the CHANNEL/UP CHANNEL/DOWN routine.

If the newly selected channel is a premium channel then a Preview Flag is tested (step 1306) to see if the preview interval has expired. If it has, step 1308 loads character generator 212 with a message instructing the patient on how to rent the set. The remainder of the message area is filled with block characters so that the area of the TV screen allotted to message display but not required to display the rent message is, in effect, blanked out, thus making it difficult to watch the video. At step 1310 the microprocessor sends a code over lead 252 to mute the sound on the TV receiver. A return is then made to the CHANNEL/UP CHANNEL/DOWN routine.

If the test at step 1306 indicates that the preview time has not expired, the warning message saved at step 869 is sent (step 1312) to the character generator 212 so that it is displayed on the TV screen. At step 1314, an interrupt timer overflow is enabled so that the Preview Flag is set when the timer overflows. The Rent Counter which times the rental periods is cleared at step 1316 and the program returns to the CHANNEL/UP CHANNEL/DOWN routine.

From the foregoing description it is seen that the present invention provides an improved system for billing for TV rentals. The system permits messages to be displayed on a patient's TV. The system also permits control of the TV receiver to be taken out of the hands of the patient so that he cannot change channels or turn the TV receiver off. Billing is stored within each television set and may be moved from one set to another when a patient is moved from one room to another.

While a preferred embodiment of the invention has been described in specific detail, it will be understood that various modifications and substitutions may be made in the described embodiment without departing from the spirit and scope of the invention as defined by the appended claims.

I claim:

1. A computer controlled television system including a central processor generating command messages, a plurality of television sets, each television set including a microprocessor-controlled means for monitoring use of the television set of which said microprocessor-controlled means forms a part and generating charge data, and a non-volatile memory for storing the charge data, said system being characterized in that each said microprocessor-controlled means is selectively responsive to a read bill command message to transfer the charge data from the memory to the central processor and responsive to a write bill command message for storing in the memory the charge data contained in the write bill command message, whereby the charge data can be transferred from the memory in one television set to the memory in another television set.

2. A computer controlled television system as claimed in claim 1 wherein said microprocessor-controlled means is responsive to a rental command message for generating the charge data on a per-day, per-program or per-minute basis as specified in said rental command message.

3. A computer controlled television system comprising:

a central computer issuing command messages;

a plurality of television sets connected to said computer, each of said television sets including:

a television receiver by means of which a video signal transmitted over one of a plurality of channels can be viewed on a screen, switch means for selecting the channel to be viewed on said screen thereof, a microprocessor that receives said command messages from said central computer, a memory addressable by the microprocessor thereof for storing display messages, and a video character generator connected to said television receiver thereof which receives the display messages from said memory thereof by operation of said microprocessor thereof to display said display messages on said screen thereof;

wherein said microprocessor thereof is responsive to a premium command message for saving in said memory thereof the numbers of premium channels for which a charge is to be made for viewing and wherein said microprocessor thereof includes means for comparing the number of the channel selected for viewing with the numbers of said premium channels saved in said memory thereof and, when the number of the selected channel equals one of said premium channel numbers, transferring a warning display message from said memory thereof to said video character generator thereof whereby said warning display message is displayed on said screen thereof.

4. A computer controlled television system as claimed in claim 3 wherein each television set is characterized in that:

said microprocessor thereof includes means responsive to a set preview command message for storing in said memory thereof a value indicating the duration of a preview period during which a premium channel can be viewed free of charge, means for tolling said preview period when the premium channel is selected, and means responsive to said tolling means for muting the sound of said television receiver thereof and blocking at least a portion of said screen thereof when said preview period has been tolled.

5. A computer controlled television system as claimed in claim 3 wherein every command message issued by said central computer includes an identification code and wherein each television set is characterized in that:

the memory thereof stores a set identification code, and the microprocessor thereof is responsive to the premium command message for saving said premium channel numbers in said memory thereof only if said set identification code is equal to the identification code in the premium command message.

6. The computer controlled television system as claimed in claim 3 wherein at least one of said command messages includes an identification code and a new display message, and wherein each television set is characterized in that:

said memory thereof stores a set identification code, and said microprocessor thereof saves said new display message to the memory thereof only if the identification code in said at least one of said command messages is equal to the set identification code stored in the memory thereof.

7. The computer controlled television system as claimed in claim 6 wherein each television set is characterized in that said new display message is transferred from said memory thereof to said video character generator thereof when the number of said selected channel equals one of said premium channel numbers.

8. The computer controlled television system as claimed in claim 6 wherein each one of said television sets is characterized in that the set identification code stored in the memory thereof identifies said one of said television sets as a member of a group of said television sets.

9. The computer controlled television system as claimed in claim 3 wherein at least one of said command messages includes an identification code and a new display message to be displayed immediately, and wherein each television set is characterized in that:

the memory thereof stores a set identification code, and said microprocessor thereof transmits said new display message directly to said video character generator thereof to be displayed immediately on said screen thereof only if the identification code in said at least one of said command messages is equal to the set identification code stored in the memory thereof.

10. The computer controlled television system as claimed in claim 9 wherein each one of said television sets is characterized in that the set identification code stored in the memory thereof identifies said one of said television sets as a member of a group of said television sets.

11. The computer controlled television system as claimed in claim 3 wherein each television set is characterized in that said display messages are displayed on said screen thereof by said video character generator thereof concurrently with said video signal.

12. The computer controlled television system as claimed in claim 3 wherein said switch means of each one of said television sets includes manually-actuated switches and controls operation of said one of said television sets in addition to selecting the channel to be viewed, each of said television sets, characterized in that sad microprocessor thereof, during certain modes of operation, transfers a display message from said memory thereof to said video character generator thereof for display on said screen thereof in response to actuation of any one of said switches thereof.

\* \* \* \* \*